(12) United States Patent
Te Velde

(10) Patent No.: US 10,213,044 B2
(45) Date of Patent: Feb. 26, 2019

(54) JUICE EXTRACTOR

(71) Applicant: KONINKLIJKE PHILIPS N.V., Eindhoven (NL)

(72) Inventor: Mart Kornelis-Jan Te Velde, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/909,839

(22) PCT Filed: Mar. 26, 2015

(86) PCT No.: PCT/EP2015/056600
§ 371 (c)(1),
(2) Date: Feb. 3, 2016

(87) PCT Pub. No.: WO2015/150233
PCT Pub. Date: Oct. 8, 2015

(65) Prior Publication Data
US 2017/0245669 A1      Aug. 31, 2017

(30) Foreign Application Priority Data
Mar. 31, 2014   (EP) .................................... 14162525

(51) Int. Cl.
*B02C 15/00*     (2006.01)
*A23N 1/00*      (2006.01)
(Continued)

(52) U.S. Cl.
CPC ............. *A47J 19/025* (2013.01); *A47J 43/04* (2013.01)

(58) Field of Classification Search
CPC ........ A47J 19/025; A47J 19/04; A47J 19/027; A47J 43/04; B02C 15/00; A23N 1/00
(Continued)

(56) References Cited

U.S. PATENT DOCUMENTS 4,363,265 A * 12/1982 Tanioka ................ A47J 19/025
                                                   100/117
4,385,553 A    5/1983 Ihara et al.
(Continued)

FOREIGN PATENT DOCUMENTS

CN        202514559 U     11/2012
JP          5812617 B2    11/2015
(Continued)

*Primary Examiner* — Michael G Hoang

(57) ABSTRACT

A juice extractor includes a food processing chamber having a food inlet, a juice outlet and a pulp outlet. The food processing chamber includes a food entry section having the food inlet and the juice outlet, and a food compression section extending between the food entry section and the food pulp outlet. A spindle extends through the food processing chamber for transporting food from the food entry section through the food compression section. The spindle has a body and a helical member extending from the body by a height of no more than 10 mm. The helical member includes a helical cutting portion in the food entry section, and a motor having a gear box coupled to the spindle and configured to rotate the spindle at a rotation speed of at least 300 rotations per minute during operation of the juice extractor.

17 Claims, 6 Drawing Sheets

(51) Int. Cl.
*A47J 19/02* (2006.01)
*A47J 43/04* (2006.01)

(58) Field of Classification Search
USPC .............. 99/509–510, 540–547, 552–553,
99/557–559, 564, 566, 575–576, 593,
99/495; 426/473, 518; 100/117, 145;
336/330.1
See application file for complete search history.

(56) References Cited

U.S. PATENT DOCUMENTS

| | | | |
|---|---|---|---|
| 4,429,626 A | | 2/1984 | Ihara |
| 4,440,074 A | | 4/1984 | Ihara |
| 4,457,223 A | * | 7/1984 | Spinato ................ A23N 15/025 100/117 |
| 5,906,154 A | | 5/1999 | Yoon |
| 6,425,321 B1 | * | 7/2002 | Yip ...................... A47J 19/025 99/495 |
| 2004/0231529 A1 | | 11/2004 | Jan |
| 2009/0064875 A1 | | 3/2009 | Trovinger |
| 2012/0137899 A1 | * | 6/2012 | Kim ..................... A47J 19/027 99/509 |

FOREIGN PATENT DOCUMENTS

| | | |
|---|---|---|
| KR | 101225232 B1 | 1/2013 |
| WO | 2012173333 A1 | 12/2012 |
| WO | 2013011429 A1 | 1/2013 |

* cited by examiner

Section A-A

Detail C
Scale 5:1

JUICE EXTRACTOR

This application is the U.S. National Phase application under 35 U.S.C. § 371 of International Application No. PCT/EP2015/056600, filed on Mar. 26, 2015, which claims the benefit of International Application No. 14162525.1 filed on Mar. 31, 2014. These applications are hereby incorporated by reference herein.

FIELD OF THE INVENTION

The present invention relates to a juice extractor comprising a food processing chamber including a food inlet, a juice outlet and a pulp outlet, wherein the food processing chamber comprises a food entry section including the food inlet and the juice outlet; and a food compression section extending between the food entry section and the food pulp outlet; a spindle extending through the food processing chamber for transporting food from the food entry section through the food compression section.

BACKGROUND OF THE INVENTION

Electric juice extractors such as macerating juicers have been used for many decades now. Such juicers typically mimic the human juicing process in which a large amount of force is applied to a portion of food, e.g. fruit or vegetable, to remove the juice from the food. Consequently, electric juice extractors typically apply a high torque to a spindle carrying a helical cutting blade for extracting the juice from the food. This is typically achieved by an electromotor coupled to the spindle through a gear box that turns the spindle at a rate of around 100-120 rotations per minute (RPM). An example of such an electric juice extractor is disclosed in U.S. Pat. No. 4,440,074.

The requirement to deliver the high torque for mimicking the human juicing process typically requires a relatively large electromotor and gearbox, i.e. a relatively large drive train, operating at the aforementioned speeds, for instance in order to prolong the lifetime of the juice extractor. Moreover, in order to produce a desirable food throughput, e.g. typically in the region of 4-10 g per second, a relatively large spindle is typically used. Consequently, electric juice extractors are relatively large and difficult to miniaturise because of these requirements.

SUMMARY OF THE INVENTION

The present invention seeks to provide a juice extractor that can be miniaturised without significantly compromising food throughput.

According to an aspect, there is provided a juice extractor comprising a food processing chamber including a food inlet, a juice outlet and a pulp outlet, wherein the food processing chamber comprises a food entry section including the food inlet and the juice outlet; and a food compression section extending between the food entry section and the food pulp outlet; a spindle extending through the food processing chamber for transporting food from the food entry section through the food compression section, said spindle comprising a body and a helical member extending from said body by a height of no more than 10 mm, said helical member including a helical cutting portion in the food entry section; and a motor including a gear box coupled to said spindle and adapted to rotate the spindle at a rotation speed of at least 250 rotations per minute during operation of the juice extractor.

The present inventor has realized that contrary to the well-established principle of high torque food juicers in which the food is cut in relatively large portions and compressed at high torque to extract the juice from the food, it is equally feasible to extract the juice from the food using a lower torque process, in which the food is shredded into relatively small portions and processed at higher rotation speeds of the spindle to ensure that the overall food throughput of the juice extractor is not significantly affected. In other words, the present inventor has realized that in order to arrive at a suitable automated juicing process, it is not necessary to take the human juicing process as a starting point. This insight has not been previously made, as demonstrated by the fact that state of the art juice extractors invariably apply a high torque/low rpm juicing process.

The helical cutting portion comprises an angled or curved cutting blade with a cutting edge angled or pointing towards the food compression section. It has been found that the typical cutting processes applied in the state of the art juice extractors do not satisfactorily work when being scaled down, in particular when the spindle is miniaturised. Therefore, in at least some embodiments, a cutting architecture is provided in which the food is grabbed and shredded by the angled or curved cutting blade of the helical cutting portion, which is capable of effectively cutting up the food even when compact spindles are being included in the juice extractor.

The helical cutting portion may be partitioned into a plurality of cutting edges to further improve the efficiency of the food shredding process.

The food inlet may have a wall portion proximal to the food compression section for holding the food during a cutting operation by the helical cutting portion. This is contrary to at least some prior art arrangements in which this wall portion typically comprised a cutting edge to perform a shearing cutting action. The present inventor has found that such a shearing action no longer works when the spindle diameter and particularly the height of the helical member on the spindle body becomes too small, e.g. 10 mm or less.

The helical cutting portion may extend over the full length of the spindle, i.e. may extend from the food entry section into the food compression section of the food processing chamber. Alternatively, the helical member may further comprise a helical food transport portion adjoining the helical cutting portion, said helical food transport portion being located in the food compression section. The helical food transport portion may have a different shape to the helical food cutting portion, e.g. may not comprise (a curved) cutting edge as this helical food transport portion may not be required to further shred the food.

In an embodiment, the helical member extends from said body by a height of no more than 1-5 mm, preferably no more than 1-3 mm. This yields a particularly compact spindle geometry, which therefore facilitates miniaturisation of the juice extractor.

In an embodiment, the motor is adapted to rotate said spindle at a rate of at least 500 rotations per minute during operation of the juice extractor. This facilitates further miniaturisation of the spindle geometry as the higher rotation speed facilitates small portions of food being shredded per spindle rotation, such that the spindle can be reduced in size.

Juice extraction is achieved by compression of the shredded food portions that are transferred from the food entry section into the food compression section of the food processing chamber. This is typically achieved by gradually reducing the volume in which the shredded food portion is located.

In an embodiment, this may be achieved when the spindle body is a frustoconical body having an increasing diameter in the direction from the food entry section to the food compression section, wherein the spindle has a substantially constant outer diameter. Consequently, the volume of the food compartment defined by adjacent turns of the helical member and the portion of the spindle body extending between these adjacent turns is gradually reduced as the spindle diameter increases and the height of the helical member reduces by the same amount in order to maintain the constant outer diameter of the spindle.

Additionally or alternatively, the pitch of the helical member may decrease in the direction of the pulp outlet at least inside the food compression section in order to reduce the volume of the food compartments of the spindle carrying the food into the food compression section.

Additionally or alternatively, the height of the helical member may decrease in the direction of the pulp outlet at least inside the food compression section in order to reduce the volume of the food compartments of the spindle carrying the food into the food compression section.

Additionally or alternatively, the inner dimensions of the food compression section may decrease in a direction from the food entry section towards the pulp outlet in order to progressively reduce the volume available to the food portions inside the food compression section.

The spindle may be a plastic spindle in order to facilitate a low-cost spindle. Because of the relatively low-torque arrangement, plastic may be used as a material without compromising the durability of the juice extractor and the spindle in particular.

In an embodiment, the food entry section comprises a first wall portion opposite a second wall portion, each of said wall portions extending from the food inlet, wherein a gap between the spindle and the first wall portion is smaller than a further gap between the spindle and the second wall portion. Such a non-symmetrical arrangement allows for a food portion to extend into the food entry section in between the spindle and the second wall portion, wherein the cutting action of the spindle may shred this food portion and compress it in between the spindle body and the first wall portion, which facilitates a more efficient food shredding and juice extraction process.

In an embodiment, the spindle is oriented in a horizontal plane during normal use of the juice extractor. In other words, the juice extractor may be a horizontal juice extractor.

Alternatively, the spindle may be oriented in a vertical plane during normal use of the juice extractor. In other words, the juice extractor may be a vertical juice extractor.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
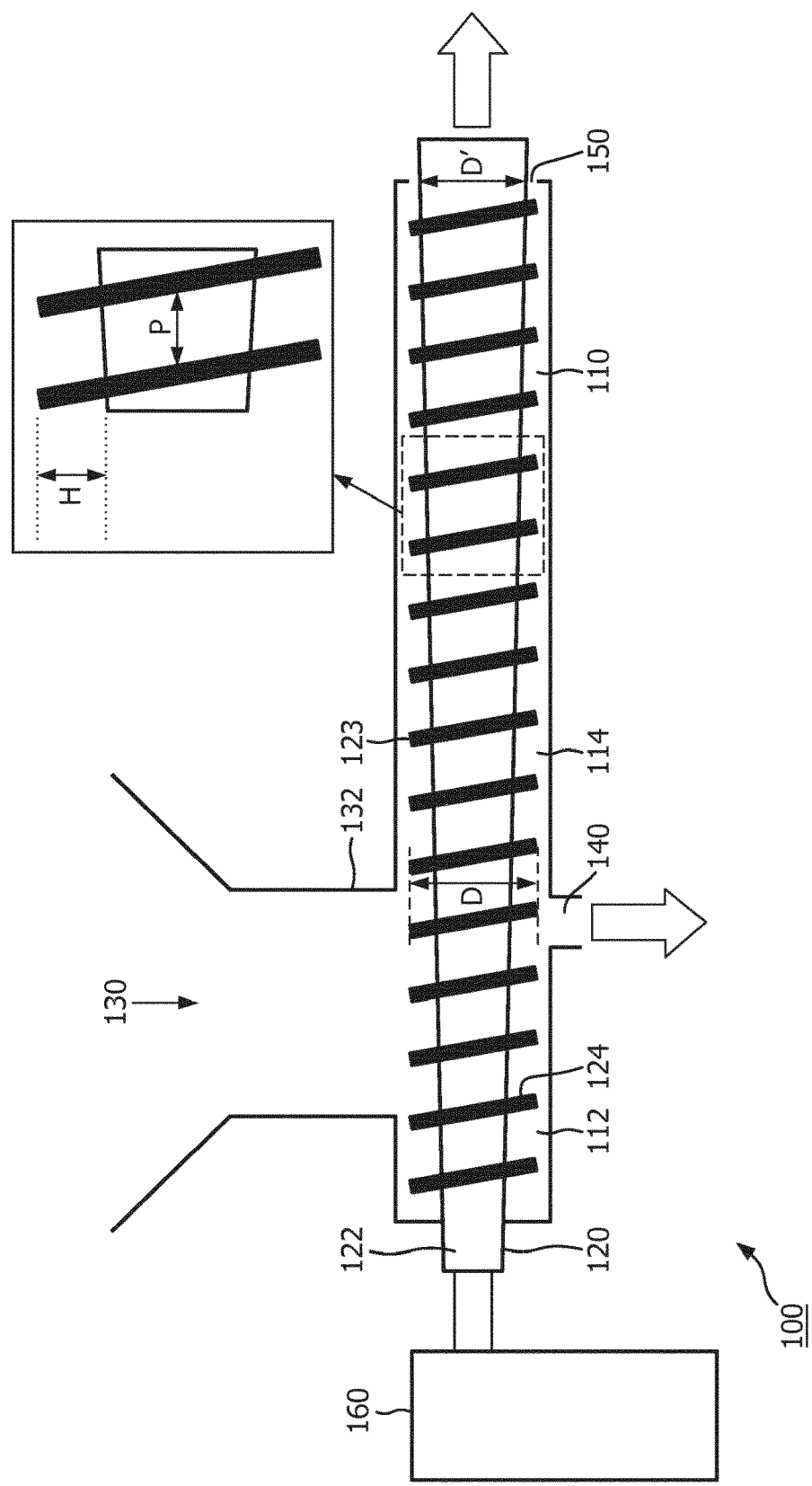
FIG. 1 schematically depicts a juice extractor according to an embodiment of the present invention.

It should be understood that the Figures are merely schematic and are not drawn to scale. It should also be understood that the same reference numerals are used throughout the Figures to indicate the same or similar parts.

The present invention is based on the insight that a direct relation exists between the spindle geometry and the driving torque of a juice extractor such as a macerating juicer:

$$T = F \times R \qquad (1)$$

T is torque (Nm), F is force (N) and R is the (outer) spindle radius (m). The driving torque T of the spindle scales approximately linearly with the amount of food processed per spindle turn. The amount of food processed per spindle turn is governed by the volume of the spindle compartments that are defined by the height of two neighbouring turns of the helical member that is typically present on the spindle body and the distance (pitch) between these neighbouring turns. Consequently, the driving torque of the spindle scales approximately linearly with the height of the helical member and its pitch, in particular in the location where the food is cut in the juice extractor.

FIG. 1 schematically depicts a juice extractor 100 such as a masticating juicer according to an embodiment of the present invention. The juice extractor 100 comprises a main body delimiting a food processing chamber 110 in which a spindle 120 is housed. The chamber 110 comprises a food entry section 112 that is adapted to receive food inserted into the juice extractor 100 through a food inlet 130 and a food compression section 114 in which the food is compressed to extract the juice from the food. The food inlet 130 may have any suitable shape, e.g. a funnel shape, and typically includes a wall portion 132 that is proximal to the food compression section 114 for reasons that will be explained in more detail later.

In at least some embodiments, the food compression section 114 cooperates with the spindle 120 to compress chunks of food that are transported by the spindle 120 from the food entry section 112 to the food compression section 114. Such compression is typically realized by gradually reducing the available volume housing the chunks of food as these chains are being transported from the food entry section 112 through the food compression section 114 towards a pulp outlet 150 as will be explained in more detail later. This compression creates a pressure gradient of increasing pressure from the food entry section 112 towards the pulp outlet 150. This pressure gradient forces the juice squeezed out of the chunks of food in the direction of the food entry section 112, where it can exit the juice extractor 100 through juice outlet 140. This for instance may be achieved by remaining a small gap between the spindle 120 and the inner wall of the food compression section 114, wherein the gap is dimensioned such that the extracted juice can flow through the gap towards the juice outlet 140, whilst preventing food pulp remaining on the spindle 120 from entering this gap. It should however be understood that the juice outlet 140 may be placed in any suitable location, i.e. the juice outlet 140 is not necessarily located in the food entry section 112. Such a juice outlet 140 optionally may comprise a sieve to filter out remaining solid materials.

The spindle 120 typically has an outer diameter D limited to less than 50 mm, such as 35 mm or less or 30 mm or less in some embodiments. In at least some embodiments, the spindle 120 may have different diameters in the food entry section 112 and the food compression section 114. For instance, as shown in the example embodiment in FIG. 2, the portion 120' of the spindle 120 in the food entry section 112 may have an outer diameter of around 30-35 mm whereas the portion 120" of the spindle 120 in the food compression section 114 may have an outer diameter of about 15-25 mm.

In at least some embodiments, the spindle 120 is made of a plastic material. This has the advantage that the spindle 120 can be manufactured cheaply, for instance by molding or casting techniques and is light-weight. This facilitates easy handling of the spindle 120, for instance when it is removed from the juice extractor 100 for cleaning purposes. Such a relatively compact spindle 120 is for instance beneficial if the spindle 120 is to be cleaned in a dishwasher, as the spindle will take up little space in the dishwasher.

The spindle 120 comprises a body 122 carrying a helical member 123 having a helical cutting portion 124 that will be explained in more detail later. The helical cutting portion 124 is present on the body 122 at least in the food entry section 112 of the food processing chamber 110. As will be explained in more detail below, the helical cutting portion 124 may extend over the whole of the spindle 120, in which case the entire helical member 123 is formed of the helical cutting portion 124. Alternatively, the helical member 123 may comprise a helical cutting portion 124 and a helical food transport portion adjoining the helical cutting portion 124, wherein the helical food transport portion is arranged to transport the food chunks cut by the helical cutting portion 124 from the food entry section 112 towards and through the food compression section 114.

Figure 2:
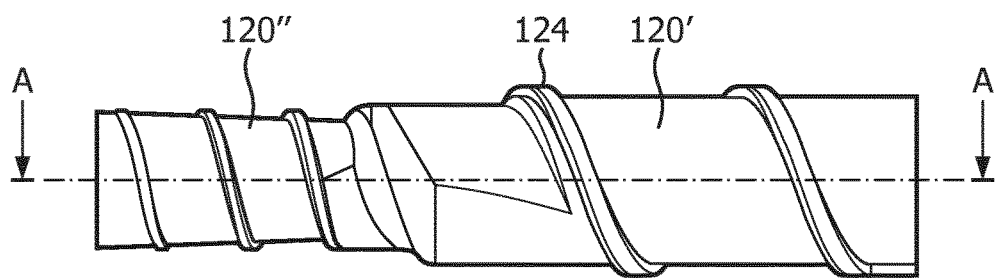
FIG. 2 schematically depicts an example aspect of a juice extractor according to an embodiment of the present invention.
Figure 2:
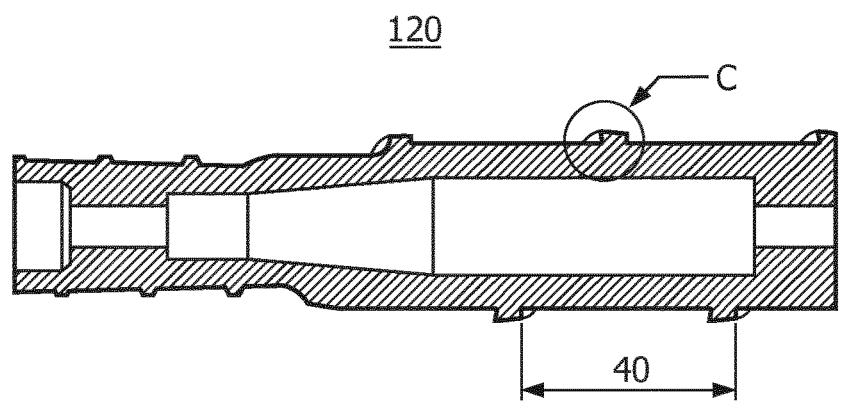
Figure 2:
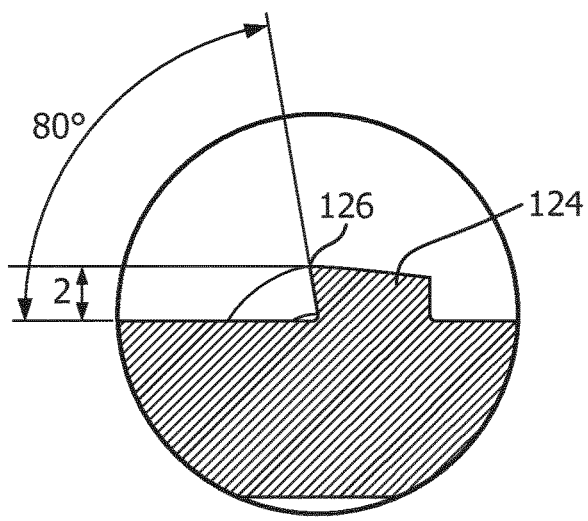

In at least some embodiments, the spindle 120 will have a constant outer diameter D, which is the combination of the diameter D' of the body 122 and the height H by which the helical member 123 extends from the body 122 as can be seen in the inset showing a magnified view of the portion of the spindle 120 highlighted by the dashed box in FIG. 1. It is noted for the avoidance of doubt that the inner diameter D' and the height H may not be constant; for instance, the body 122 may be frustoconical body having a gradually increasing diameter D' in the direction of the pulp outlet 150 such that the height H of the helical member 123 reduces at the same rate and in the same direction in order to ensure that the outer diameter D of the spindle 120 remains constant. The inset further depicts the pitch P of the helical member 123, i.e. the distance between neighboring turns of the helical member 123. In some embodiments, the pitch P is constant over the full length of the spindle 120, i.e. throughout the food processing chamber 110. In some alternative embodiments, the pitch P may be variable, e.g. decrease at least in a part of the food compression section 114 in order to aid with the compression of the food chunks inside the food compression section 114. In FIG. 2, a pitch P of 40 mm is shown by way of non-limiting example.

As shown in FIG. 1, the juice extractor 100 further comprises an electromotor 160 including a gearbox (not shown) that is coupled to the spindle 120 and is arranged to rotate the spindle 120 at a rate of at least 250 rpm, e.g. at a rate of at least 300 rpm, or at a rate of at least 500 rpm in some embodiments. In some specific embodiments, the electromotor 160 may be arranged to rotate the spindle 120 at a rate of up to 2000 rpm or beyond. As explained above, due to the fact that the geometry of the spindle 120 has been reduced, in particular the size of the compartments on the spindle body 122 as defined by the height and pitch of neighboring turns of the helical member 123. By rotating the miniaturized spindle 120 at this much higher rate than state of the art juice extractors, the juice extractor 100 is still capable of producing comparable food throughput rates of e.g. 5-10 g/s. This furthermore facilitates the use of a smaller drive train, i.e. the electromotor 160 and gearbox, as the gearing is required to produce less torque than is the case in the state of the art electromotors because smaller portions of food require compressing, with the required amount of torque scaling substantially linearly with the size of the food chunks that need to be compressed to extract the juice therefrom.

By comparison, whereas a state of the art juice extractor typically comprises an electromotor driving a spindle at around 120 rpm (two rotations per second), the juice extractor 100 typically operates the spindle 120 at rotation speeds of at least 5 and preferably in excess of 8 rotations per second (rotations/sec). The amount of food processed per second (Food/sec) by the juice extractor can be expressed as follows:

$$\text{Food/sec} = \text{compartment volume} * \text{compartment load} * \text{rotations/sec} \qquad (2)$$

The compartment load is the percentage of the compartment that is actually filled with food when the food is cut into chunks or pieces. This load figure is relatively independent from spindle geometry and may be in the range of 40-60%. Therefore, the above formulae can be simplified as follows:

$$\text{Food/sec} \sim \text{compartment volume} * \text{rotations/sec} \qquad (3)$$

As it has been demonstrated in equation (1) that the torque required to drive the spindle can be approximated to scale linearly with the pitch and height of the helical member 123, it can be understood that by reducing the spindle compartment volume the torque can be reduced by a same amount, which can be compensated by same amount of increase in the spindle rotation speed to ensure that the food throughput of the juice extractor 100 remains largely unaffected. Consequently, a juice extractor 100 having a reduced size food processing chamber 110 can be achieved that can achieve food throughput performance that is comparable to existing larger juice extractors. For example, a juice extractor 100 according to embodiments of the present invention can extract carrot juice from carrots at a peak torque of 2.5 Nm compared to existing juicers operating a peak torques of 9 Nm or even 20-24 Nm when processing carrots.

Figure 3:
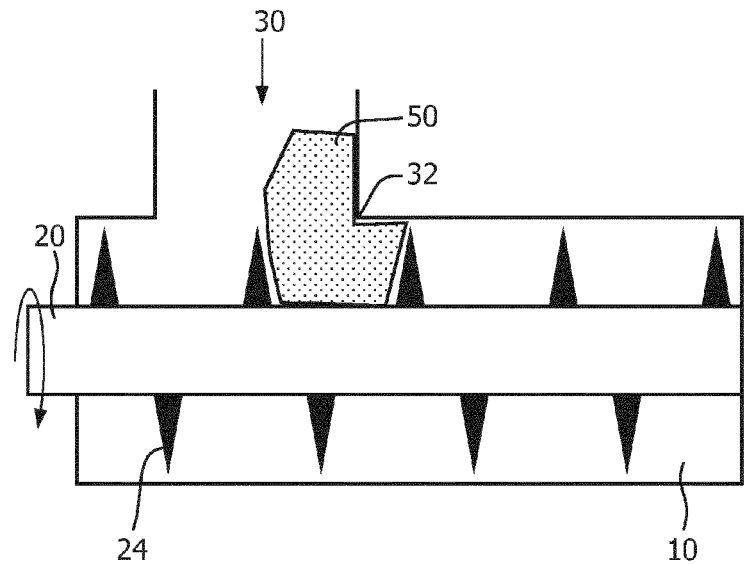
FIG. 3 schematically depicts a cutting process of a prior art juice extractor.

In order to facilitate miniaturization of the food processing chamber 110 and the spindle 120 located therein, a novel food cutting principle may be used in at least some of the embodiments. FIG. 3 schematically depicts the cutting principle applied by state of the art juice extractors comprising a food processing chamber 10 in which a spindle 20 carrying a helical member 24 is mounted. During operation, a portion of food 50 enters the food processing chamber 10 through a food inlet 30. The rotation of the spindle 20 causes the helical member 24 to press the food portion 50 against cutting edge 32 of the food inlet 30, such that the food portion 50 is dissected in a shearing fashion. In other words, the primary function of the helical member 24 is a pressing or holding function (forcing the food portion 50 against the cutting edge 32), with the cutting function primarily being performed by the cutting edge 32.

However, the present inventor has discovered that this cutting process may no longer work sufficiently well when the height H of the helical member 24 is reduced beyond a critical point. This is because the pushing force generated by the helical member 24 as a consequence of the rotation of the spindle 20 can be decomposed in a horizontal component along the axis of the spindle 20 and a vertical component along the axis of the food inlet 30. In order for this cutting principle to operate satisfactorily, a substantial horizontal force component should be present. However, the horizontal force component decreases with the depth of the compartment defined by neighboring turns of the helical member 24 and the pitch therebetween as previously explained, such that each spindle geometry has a critical dimension for the height H of the helical member 24, below which a food portion 50 will be forced upwards into the food inlet 30 rather than into a food compression section of the food processing chamber 10 beyond the cutting edge 32.

It will be understood by the skilled person that the critical geometry of the helical member 24 will depend from various design parameters of the spindle geometry such that it is not feasible to provide a single height at which this may become problematic. Nevertheless, the present inventor has found that in the proposed geometries for the spindle 120, in particular for a height of the helical member 123 not exceeding 10 mm and preferably being in the range of 1-5 mm, this prior art cutting principle generally provides unsatisfactory results.

Figure 4:
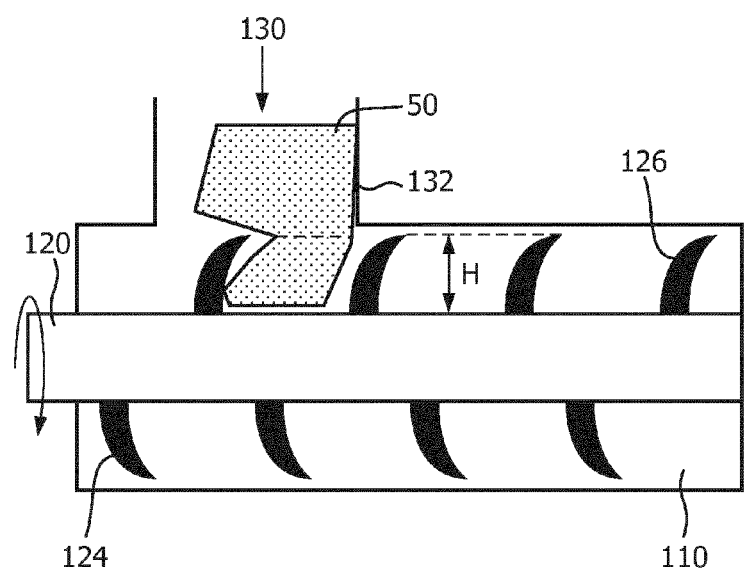
FIG. 4 schematically depicts a cutting process of a juice extractor according to an embodiment of the present invention.

In at least some embodiments, the juice extractor 100 may comprise a spindle 120 comprising a helical member 123 including a helical cutting portion 124 comprising an angled or curved cutting surface such that a leading edge 126 of the cutting surface is angled or pointing towards, i.e. is facing, the food compression section 114, as is shown in FIG. 4. A non-limiting example of an angled cutting surface is shown in FIG. 2. In other words, in FIG. 4 the leading edge 126 is pointing in the direction in which the food is being transported through the food processing chamber 110 by the rotation of the spindle 120. More particularly, the helical cutting portion 124 is shaped such that a food portion 50 entering the food inlet 130 is scraped off or shredded by the helical cutting portion 124 on the rotating spindle 120 rather than sheared off by the prior art cutting edge 32. The wall portion 132 of the food inlet 130 that is proximal to the food compression section 114 of the food processing chamber 110 acts as a food support section against which the food portion 50 is pressed by the rotation of the spindle 120, and that holds the food portion 50 in place whilst being shredded by the helical cutting portion 124. It has been found that this novel cutting mechanism still produces excellent food cutting results for helical members 123 having a height H of 3 mm or less.

Figure 5:
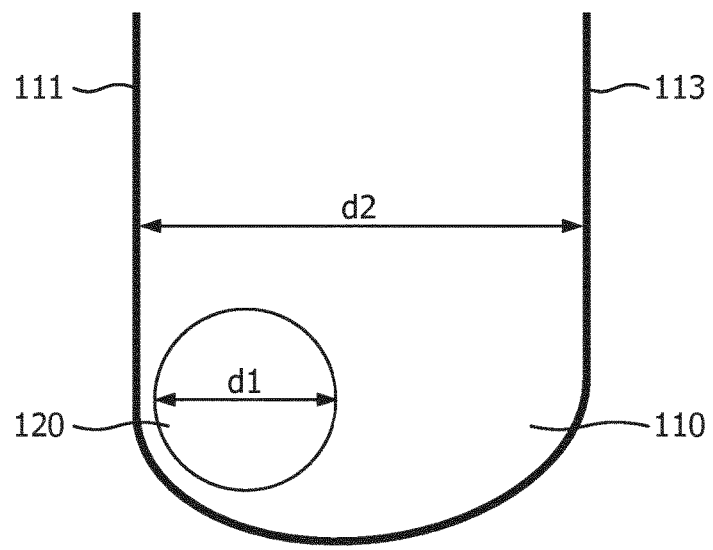
FIG. 5 schematically depicts an aspect of a juice extractor according to an embodiment of the present invention.

The rate of food processing may be further improved by the placement of the spindle 120 off-center in the food processing chamber 110, as is shown in FIG. 5, which schematically depicts a cross-section of the food processing chamber 110 including a first sidewall 111 and a second sidewall 113. This ensures that food can enter the food processing chamber 110 in between the spindle 120 and the second sidewall 113 without having to be grabbed by the spindle 120. In other words, the volume between the spindle 120 and the second sidewall 113 can temporarily store food for grabbing and shredding by the spindle 120. The first sidewall 111 and the second sidewall 113 may be extensions of respective sidewalls of the food inlet 130.

The spindle 120 may be dimensioned such that its outer diameter d1 has a ratio not exceeding 1:3 with the width d2 of the food processing chamber 110, i.e. the distance between the first sidewall 111 and the second sidewall 113; i.e. d1:d2≤1:3. It has been found that if these ratios are maintained the effectiveness of the shredding process is not affected by the presence of the volume between the spindle 120 and the second sidewall 113. As will be understood by the skilled person, a relatively large part of the helical cutting surface of the spindle 120 is brought into contact with the food portion 50 in this manner, which relatively large contact area increases the grip of the spindle 120 on the food portion 50. This therefore further supports the miniaturization of the spindle 120 whilst maintaining an efficient and effective food cutting process.

The helical cutting portion 124 of the helical cutting member 123 may be a continuous helical cutting portion 124, i.e. may comprise a continuous cutting edge 126, in some embodiments. Alternatively, the helical cutting portion 124 may be partitioned into a plurality of cutting edges 126, i.e. the helical cutting member 123 may be periodically interrupted, in order to increase the number of cutting edges 126 shredding the food portion 50. This may further increase the contact area between the helical cutting portion 124 and the food portion 50, thereby further increasing the ability of the spindle 120 to grab the food portion 50, thus facilitating further miniaturization of the spindle 120 and of the height of the helical member 123 in particular.

Figure 6:
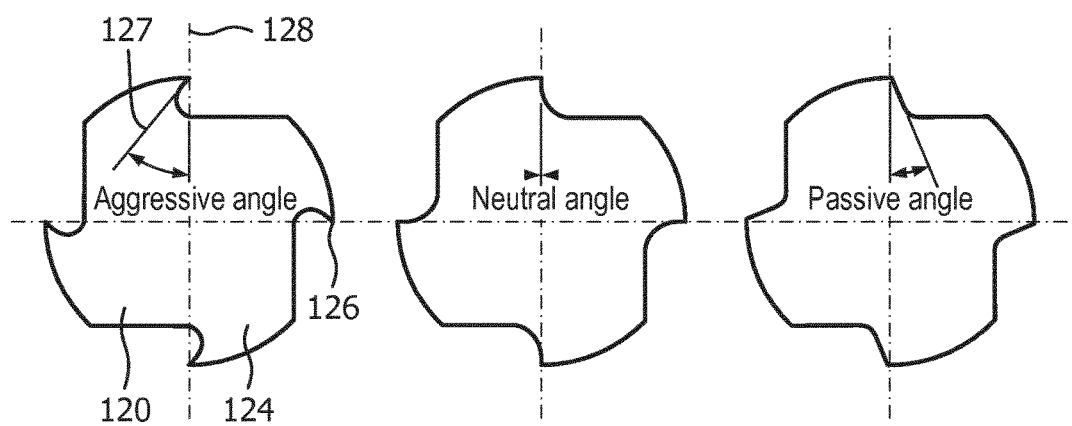
FIG. 6 schematically depicts another aspect of a juice extractor according to an embodiment of the present invention.

FIG. 6 schematically depicts some alternative geometries of the cutting edge(s) 126 of the helical cutting portion 124 carried by the spindle 120. The angle of the cutting edge(s) 126 may be defined as the angle between the plane 127 extending from the leading edge of the cutting edge(s) 126 towards the body 122 of the spindle 120 and the vertical symmetry axis 128 of the spindle 120. Three example embodiments are shown; a first embodiment in which the plane 127 lies behind (i.e. to the left) of the vertical symmetry axis 128, which defines an aggressive cutting angle; a second embodiment in which the plane 127 coincides with the a vertical symmetry axis 128, which defines a neutral cutting angle and a third embodiment in which the plane 127 lies in front (i.e. to the right) of the vertical symmetry axis 128, which defines an passive cutting angle. Although each type of cutting angle may be contemplated, an aggressive cutting angle is particularly preferred as this angle is best suited to facilitate the desired food grabbing process.

Figure 7:
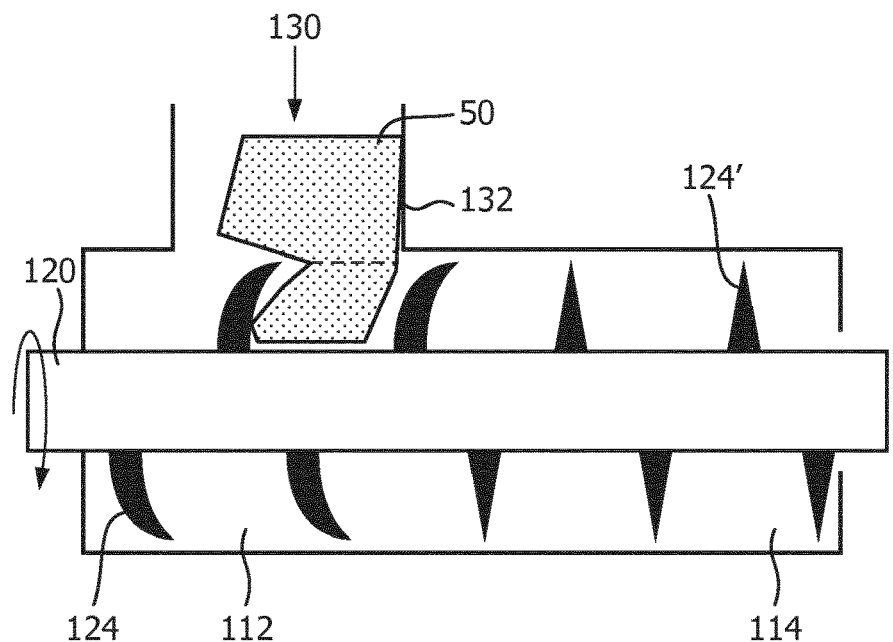
FIG. 7 schematically depicts an aspect of a juice extractor according to another embodiment of the present invention.

In the embodiments shown in FIGS. 1 and 4, the helical cutting portion 124 of the helical member 123 extends over the entire length of the body 122 of the spindle 120. It is reiterated that this is by way of non-limiting example only. FIG. 7 schematically depicts an alternative embodiment in which the helical cutting portion 124 is present in the food entry section 112 of the food processing chamber 110 only, and wherein the helical member 123 further comprises a helical food transport portion 124' adjoining the helical cutting portion 124. The helical food transport portion 124' may be located throughout the food compression section 114 of the food processing chamber 110 or at least in part thereof. The helical food transport portion 124' may be devoid of sharp edges, which for instance facilitates handling the spindle 120, e.g. for cleaning purposes, without risking injury to the person handling it. The exact point at which the helical member 123 transforms from a cutting member to a transport member is not particularly critical as long as this transformation point does not interfere with the cutting process provided by the spindle 120.

As previously explained above, after the food portion 50 is cut into chunks in the food entry section 112 of the food processing chamber 110, the food chunks are transported in the aforementioned compartments on the spindle 120 into the food compression section 114 of the food processing chamber, where the juice is extracted from the food chunks by compression. This compression is typically achieved by reducing the volume available to these food chunks. As previously explained, this for instance may be achieved by one or more of the following. The compartment size on the spindle 120 may be reduced by progressively reducing the pitch P of the helical member 123 at least inside the food compression section 114 in the transport direction of the food chunks. Alternatively or additionally, the body 122 of the spindle 120 may be a frustoconical body having a progressively increasing diameter D' in the transport direction of the food chunks. This is typically combined with a corresponding progressive reduction of the height H of the helical member 123 carried by the body 122 to ensure that the outer diameter D of the spindle 120 remains constant, i.e. D'+H=constant at any cross-section of the spindle 120.

Figure 8:
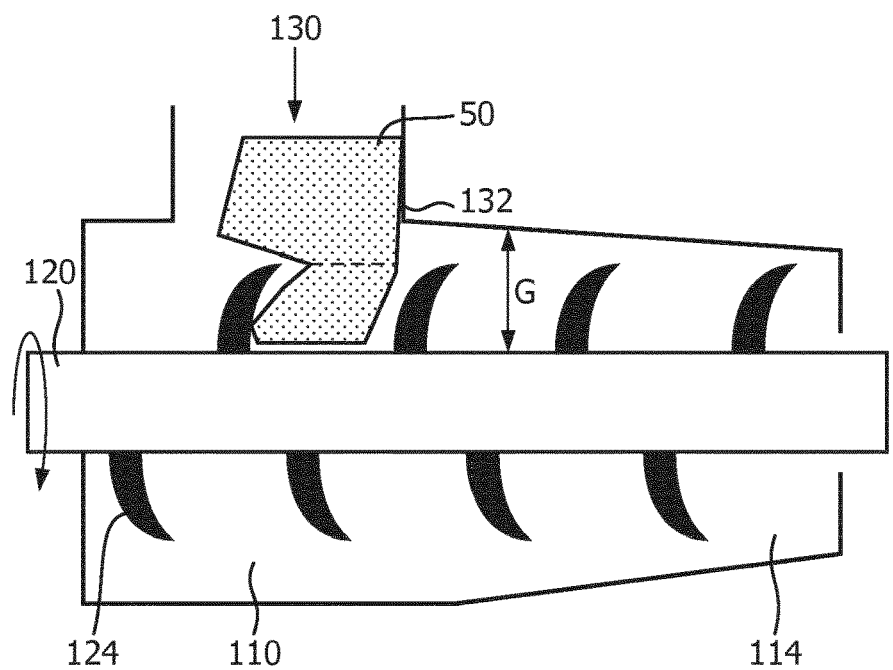
FIG. 8 schematically depicts an aspect of a juice extractor according to yet another embodiment of the present invention.

The above measures are measures to reduce the volume available to the food chunks by reducing the volume of the compartments defined on the spindle 120. Alternatively or additionally, as shown in FIG. 8, the food compression section 114 of the food processing chamber 110 may have a progressively decreasing dimensions, e.g. a progressively decreasing diameter, in the food transport direction, such that the gap G between the spindle 120 and the inner wall(s) of the food compression section 114 is progressively reduced to reduce the volume available to the food chunks as the food chunks are being transported through the food compression section 114. For the avoidance of doubt, this embodiment may be combined with any of the embodiments in which the volume of the compartments defined on the body 122 of the spindle 120 is progressively reduced in the food transport direction through the food compression section 114.

At this point, it is noted that food compression may be achieved without progressively decreasing the dimensions of the food compression section 114 and/or progressively reducing the available volume of the food chunks transported by the spindle 120. Instead, the spindle 120 may compress the food chunks against the wall section of the food compression section 114 including the pulp outlet 150, wherein the pulp outlet 150 may be dimensioned such that the pulp outlet 150 defines a constriction through which the pulp has to be forced by the spindle 120, thereby squeezing the juice out of the food chunks transported by the spindle 120.

Figure 9:
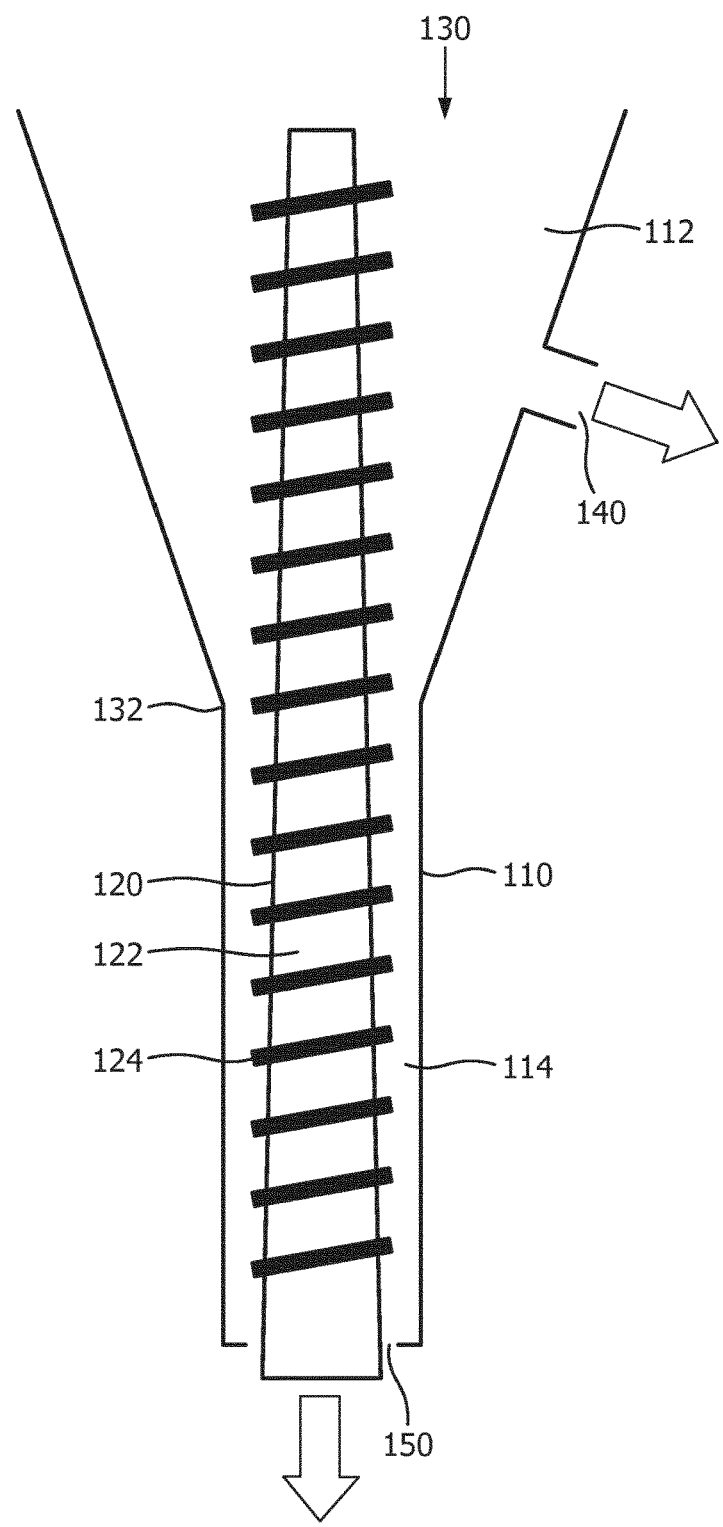
FIG. 9 schematically depicts a juice extractor according to an alternative embodiment of the present invention.

So far, various embodiments have been described in the context of a juice extractor 100 in which the spindle 120 lies in a horizontal plane during normal use of the juice extractor 100, i.e. have been described in the context of a horizontal juice extractor. However, it should be understood that the present invention is not limited to a particular juice extractor orientation; for instance, it is equally feasible that the spindle 120 lies in a vertical plane during normal use of the juice extractor 100, i.e. the juice extractor 100 is a vertical juice extractor, an example of which is schematically depicted in FIG. 9. Reference numerals in FIG. 9 that correspond to reference numerals in FIG. 1 describe the same features as previously described in the detailed description of FIG. 1 such that these features are not described again for the sake of brevity only.

An advantage that a vertical juice extractor 100 may hold over a horizontal juice extractor 100 is that food portions 50 entering the food processing chamber 110 through the food inlet 130 are less likely to be forced back into the food inlet 130 because gravity naturally pulls these food portions 50 into the food compression section 114 of the food processing chamber 110. Consequentially, less contact area between the helical cutting portion 124 and the food portions 50 may be required, which may relax the requirements of the helical cutting portion 124 and furthermore may facilitate a further miniaturization of the vertical version of the juice extractor 100 when compared with the horizontal version.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A juice extractor comprising:
 a food processing chamber including a food inlet, a juice outlet and a pulp outlet, wherein the food processing chamber comprises:
 a food entry section including the food inlet; and
 a food compression section extending between the food entry section and the pulp outlet;
 a spindle extending through the food processing chamber for transporting food from the food entry section through the food compression section, said spindle comprising a body and a helical member extending from said body by a height (H) of no more than 10 mm, said helical member including a helical cutting portion in the food entry section, wherein the height (H) is great enough so that the food is not forced into the food inlet as the food is transported through the food compression section; and
 a motor including a gear box coupled to said spindle and adapted to rotate the spindle at a rotation speed of at least 250 rotations per minute during operation of the juice extractor, wherein said helical cutting portion comprises an angled or curved cutting blade with a cutting edge angled or pointing towards the food compression section.

2. The juice extractor of claim 1, wherein the helical cutting portion is partitioned into a plurality of cutting edges.

3. The juice extractor of claim 1, wherein the helical member further comprises a helical food transport portion adjoining the helical cutting portion, said helical food transport portion being located in the food compression section.

4. The juice extractor of claim 1, wherein the helical member extends from said body by a height (H) of no more than 1 mm to 5 mm.

5. The juice extractor of claim 1, wherein the motor is adapted to rotate said spindle at a rate of at least 500 rotations per minute during operation of the juice extractor.

6. The juice extractor of claim 1, wherein the body is a frustoconical body having an increasing diameter (D') in a direction from the food entry section to the food compression section, wherein the spindle has a substantially constant outer diameter (D).

7. The juice extractor of claim 1, wherein a pitch (P) of the helical member decreases in a direction of the pulp outlet at least inside the food compression section.

8. The juice extractor of claim 1, wherein a height (H) of the helical member decreases in a direction of the pulp outlet at least inside the food compression section.

9. The juice extractor of claim 1, wherein inner dimensions of the food compression section decrease in a direction from the food entry section towards the pulp outlet.

10. The juice extractor of claim 1, wherein the food inlet has a wall portion proximal to the food compression section for holding the food during a cutting operation by the helical cutting portion.

11. The juice extractor of claim 1, wherein the spindle is a plastic spindle.

12. The juice extractor of claim 1, wherein the food entry section comprises a first sidewall opposite a second sidewall, each of said first and second sidewalls extending from the food inlet, wherein a gap (d1) between the spindle and the first sidewall is smaller than a further gap (d2) between the spindle and the second sidewall.

13. The juice extractor of claim 1, wherein the spindle is oriented in a horizontal plane during use of the juice extractor.

14. The juice extractor of claim 1, wherein the spindle is oriented in a vertical plane during use of the juice extractor.

15. The juice extractor of claim 1, wherein the helical member extends from said body by a height (H) of no more than 1 mm to 3 mm.

16. The juice extractor of claim 1, wherein the spindle comprises a first portion having a first outer diameter, and a second portion having a second outer diameter, which is less than the first outer diameter.

17. The juice extractor of claim 16, wherein the first portion is disposed in the food entry section, and the second portion is disposed in the food compression section.

* * * * *